United States Patent [19]
Fisher

[11] Patent Number: 5,604,409
[45] Date of Patent: Feb. 18, 1997

[54] ELECTRONIC LIGHTING CONTROLLER

[76] Inventor: Dalziel L. Fisher, 21916 Peppercorn Dr., Saugus, Calif. 91350

[21] Appl. No.: 90,520

[22] Filed: Jul. 12, 1993

Related U.S. Application Data

[63] Continuation-in-part of Ser. No. 835,811, Feb. 14, 1992, abandoned.

[51] Int. Cl.$^6$ .............................. H05B 39/00; H05B 37/02
[52] U.S. Cl. .......................... 315/219; 315/324; 315/231; 315/97; 315/209 R; 315/224; 363/134
[58] Field of Search ............................ 315/209 R, 324, 315/231, 85, 97, 219, DIG. 5, 224, DIG. 7; 363/134

[56] References Cited

U.S. PATENT DOCUMENTS

| | | | |
|---|---|---|---|
| 3,906,301 | 9/1975 | Fisher | 315/97 |
| 4,155,113 | 5/1979 | Simmons | 363/56 |
| 4,230,971 | 10/1980 | Gerhard et al. | 315/307 |
| 4,417,181 | 11/1983 | Leale | 315/209 R |
| 4,709,189 | 11/1987 | Kuchii | 315/209 R |
| 4,853,598 | 8/1989 | Kusko et al. | 315/101 |
| 4,950,959 | 8/1990 | Beckrot | 315/219 |
| 4,980,574 | 12/1990 | Cirrito | 307/21 |
| 5,010,278 | 4/1991 | Kang | 315/224 |
| 5,021,716 | 6/1991 | Lesea | 315/219 |
| 5,047,691 | 9/1991 | Lesea et al. | 315/244 |
| 5,063,331 | 11/1991 | Nostwick | 315/219 |

FOREIGN PATENT DOCUMENTS 0002306  1/1980  Japan ................. 315/209 R

Primary Examiner—Robert Pascal
Assistant Examiner—Arnold Kinkead
Attorney, Agent, or Firm—Lyon & Lyon

[57] ABSTRACT

An electronic circuit for converting AC or DC input current to pulsating DC, then to high frequency AC. The DC input is used for aircraft applications, or in emergency situations. The circuit operates over a wide range of input voltages and frequencies, including aircraft 115 volts, 400 Hertz. The circuit has a multivibrator that receives a smooth DC operating potential. The multivibrator is operably connected to a differentiator that produces substantially square waveform outputs. Dual wave shape filters are operably connected to the differentiator to shape the square wave outputs into a sine wave and a cosine wave respectively. A transistor switch is operably connected to each wave shape filter. The circuit has a transformer operably connected between the transistor switches and a load. In a specific embodiment the loads are either hot or cold fluorescent lamps, or the like.

33 Claims, 2 Drawing Sheets

5,604,409

ELECTRONIC LIGHTING CONTROLLER

This is a continuation-in-part of U.S. Ser. No. 07/835,811, filed on Feb. 14, 1992, now abandoned. The priority of this application is claimed under 35 U.S.C. §120.

BACKGROUND OF THE INVENTION

The present invention pertains to the field of electronic power converters, more particularly to alternating current (AC) to AC or direct current (DC) to AC converters.

Traditionally, radio noise or radio frequency interference (RFI) from ballasting devices in lighting systems has caused design difficulty in aircraft applications. A prime concern in aircraft lighting systems is RFI which can interfere with equipment aboard the aircraft, such as the automatic direction finder (ADF), or the instrument landing system (ILS). Unless specifically designed, RFI from the prior art ballasting devices can create an undesirable and hazardous phantom homing station as well as ILS landing angle changes.

Prior art ballasting devices employ either high inductance, high capacitance, or resonant choke to limit the tube current. Because of this, conventional ballasts cause inrush current which is destructive to the utility companies power generators. When thousands of these ballasts are employed in a commercial building the combined inrush current generated by these devices can create havoc on the power supply lines.

SUMMARY OF THE INVENTION

The present invention is directed to an electronic circuit capable of accepting either an AC or DC input and converting it to an AC output for powering either hot or cold cathode electrical lamps. The invention is capable of operating over a wide range of AC voltage and frequency input values while always maintaining a carefully controlled and precisely regulated output.

The preferred circuit employs a clock comprised of a free-running multivibrator and a differentiator capable of accepting constantly changing linear information. The output of the clock is preferably in the form of amplitude modulated clock pulses that are transmitted to transistor switching elements, and then transformed to drive the tubes.

The preferred circuit may also employ as circuit elements two nonpolarized capacitors connected in series. The capacitors are connected in series so that residual electrons in the capacitors are utilized to smooth the electron flow through the tubes, and to help dampen the surge at the secondary zero cross over.

The output of the preferred circuit powers a plurality of fluorescent lamps without producing radio noise to interfere with the radio navigation equipment aboard aircraft. Additionally, the preferred circuit suppresses the magnetic flux typically generated by transformers in prior devices by magnetically screening the transformer windings from external magnetic radiation. The effects of magnetic radiation on the human body are currently of great concern to the medical profession.

The preferred circuit embodying the invention differs from prior art ballasting devices in that it does not employ high inductance, high capacitance, or resonant choke to limit the tube current. Because of the small capacitors used in this circuit it can be used in commercial applications without producing any reactive detriment, either capacitive or inductive, to the main line sinusoidal power supply, and inrush current is minimized. The input waveform is as clean, undistorted, and without phase shift with the lamp on as it is with the lamp off. The preferred device also meets the commercial requirements of the utility companies regarding wave distortion, current consumption and RFI.

The preferred device is capable of sensing high or low environmental conditions and altering the current into the lamp tubes to compensate for changes in the operating environment. Further, in the preferred device the fluorescent tubes are operable at low temperatures, and capable of being dimmed at low temperatures.

The preferred device is also less dangerous than conventional ballasts because it uses lower voltage. The secondary high voltage across the tubes is considerably lower than conventional systems. With two lamps lit and running, the voltage across the tubes of a system employing the preferred circuit is between 41 and 48 volts AC. The voltage in conventional systems may range from 500 to 1,200 volts AC across the tubes, increasing the danger of lethal shocks. The lower voltage across the tubes in systems employing the preferred circuit results in the generation of less heat than conventional systems as well.

An additional advantage of the preferred device is that it is capable of being produced at very low cost. It has few components, and all of the power storage devices employed are subminiature. This facilitates high volume, low cost production of the 2.3×3.5 printed circuit board. Surface mounting vacuum machines can fill the printed circuit boards at a rate of 6000–8000 per hour.

The preferred device also operates more efficiently than conventional ballasting devices. Independent evaluation has shown that the preferred device reduces current consumption from 55 to 85 percent over conventional ballasts depending on the quality of the fluorescent lamps. Testing has also shown that fluorescent lighting tubes experience longer service life, without blackening of the ends when powered by the preferred device.

BRIEF DESCRIPTION OF THE DRAWINGS

Reference is made to the accompanying drawings in which is shown illustrative embodiments of the invention from which its novel features and advantages will be apparent to those of ordinary skill in the art.

DETAILED DESCRIPTION OF THE PREFERRED EMBODIMENT

Figure 1:
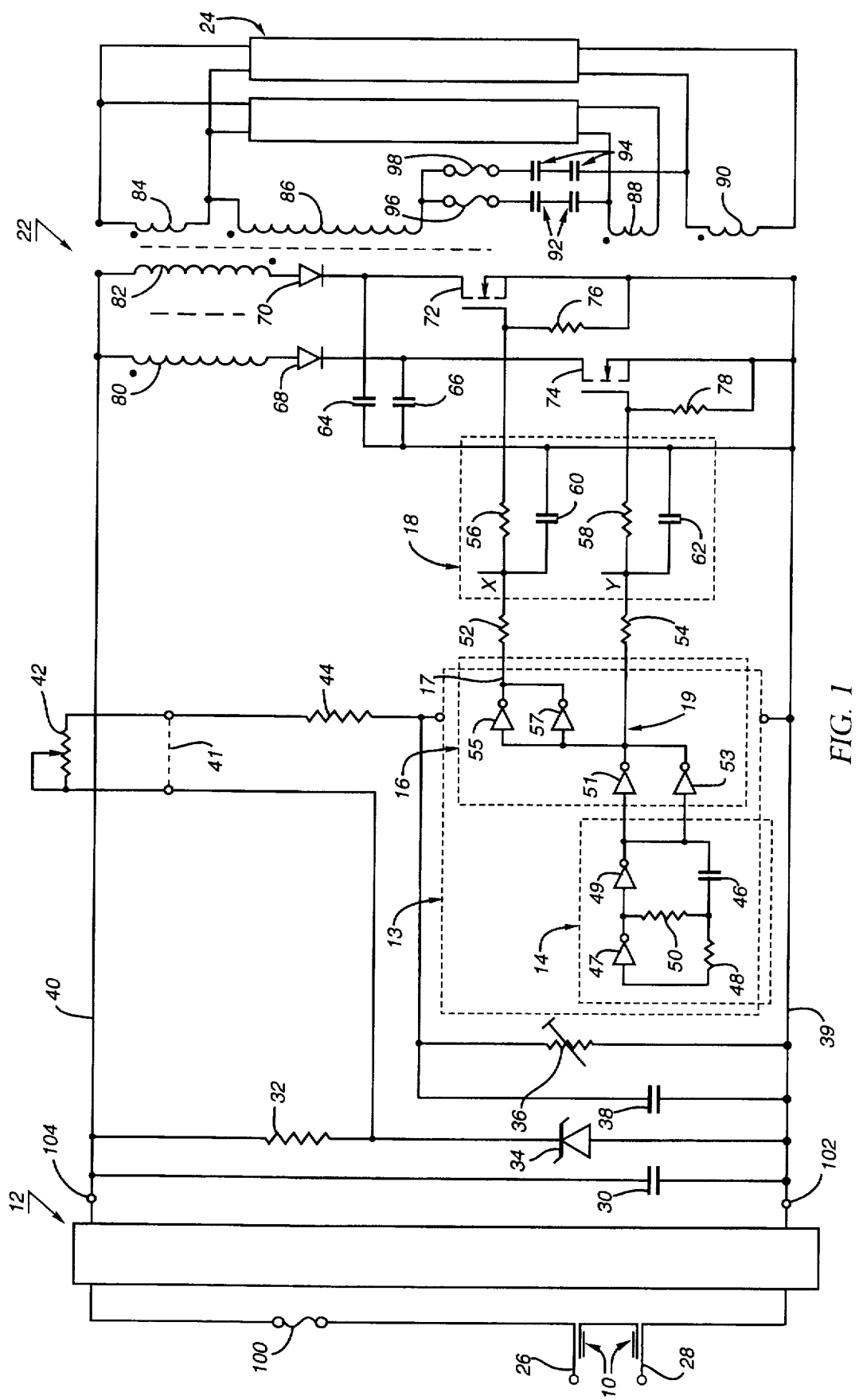
FIG. 1 is a schematic circuit diagram illustrating the circuit connected to two fluorescent tube lamps.
Figure 2A:
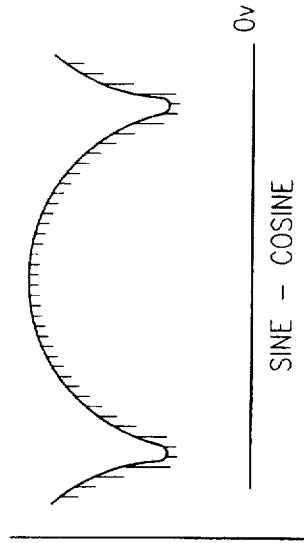
FIG. 2(a) is a graph of the input AC sinusoidal waveform.
Figure 2B:
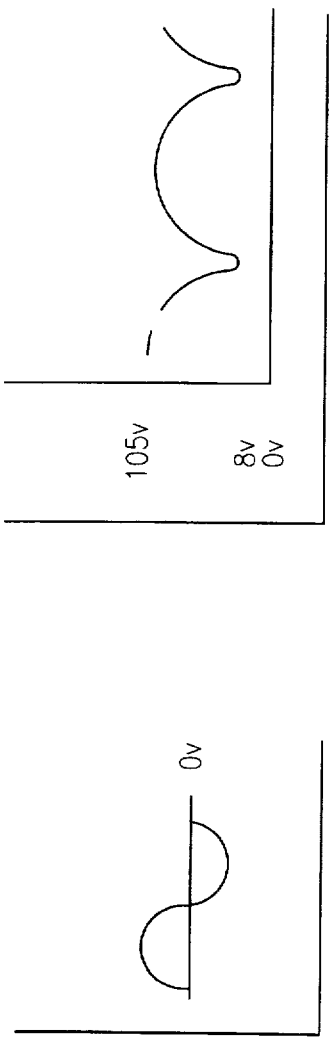
FIG. 2(b) is a graph of the input waveform after it has been fully rectified and converted into pulsating DC.

Referring to FIG. 1, the preferred device may be described at a system level as follows. The preferred device has a fixed frequency clock 13 comprised of a free-running multivibrator 14 and a differentiator 16 that is capable of accepting constantly changing linear information. The differentiator 16 output as shown in FIG. 2(e) is in the form of two substantially square wave pulsed clock signals that are transmitted to switches, preferably mosfet transistors 72 and 74 so that the voltage of these signals is at the gate terminals of mosfets 72 and 74.

The pulsed clock signals turn the mosfets 72 and 74 on and off in push-pull fashion. As the mosfets 72 and 74 are pulsed on by the clock pulses, the clock voltage as applied at the gate of the mosfets 72 and 74, appears directly across the transformer's primary windings 80 and 82. The voltage across the primary windings 80 and 82 thus varies with the clock voltage from approximately 6 to 9.5 volts. This causes a corresponding approximately 6 to approximately 9.5 volt drop in the positive line 40 voltage.

Figure 2C:
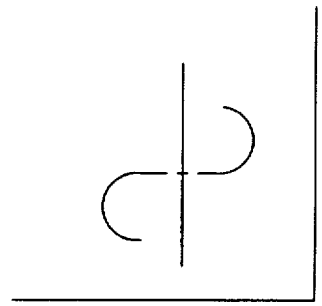
FIG. 2(c) is a graph of the input waveform as it appears along the positive supply line of the circuit.

The voltage signal of the positive line is graphically depicted in FIG. 2(c). It appears as a pulsating DC half wave carrier with amplitude modulated data carried along the crest.

The push-pull transformer 22 is connected to the push-pull mosfets 72 and 74 so that the clock's DC square rave output signals are combined and converted to an AC signal as shown in FIG. 2 (f). The AC signal at the transformer's primary windings 80 and 82 is then stepped up according to the transformer's turns ratio to high voltage AC at the transformer secondary winding 86 to drive the tubes 24.

The strike voltage for the first tube to be lit is 240 volts AC. Tube two will then strike at 228 volts AC and after both tubes 24 have struck the voltage across the tubes 24 will drop to an operating voltage of between 41 and 48 volts AC.

Referring again to FIG. 1, the device will now be described in detail. The high voltage AC operating potential for the lighting controller, illustrated in FIG. 2(a) as a sinusoidal waveform with a peak to peak voltage swing of 120 volts, is applied across AC input terminals 26 and 28 which are ultimately connected to positive line 40 and negative line 39 respectively. The AC operating potential is fully rectified by full wave bridge rectifier 12 connected between positive line 40 and negative line 39. Negative line 39 is not grounded. Fuse 100 is recommended, but is not essential for U.L. approval.

Alternatively, the preferred circuit may utilize a DC operating potential. In this case, a DC operating potential may be applied directly across terminals 102 and 104 thus bypassing full wave bridge rectifier 12.

The output of the rectifier 12 is a pulsating DC signal shown in FIG. 2(b) which is not restored or smoothed. The reason for this is because to restore or smooth the signal a large capacitor (typically 200 to 1000 μF) is generally used and this produces inrush current at the zero crossover. Instead, a small capacitor 30, preferably 0.3 μF, is connected across the positive line 40 and the negative line 39 to hold the positive line 40 to approximately 8 volts. The use of this capacitor 30 minimizes zero crossover and virtually eliminates flickering of the light. The voltage of the pulsating DC signal at the output of the rectifier 12 typically swings from approximately 8 volts up to approximately 105–110 volts and back down to approximately 8 volts over one half cycle. A resistor 32, preferably 500Ω, and a zener diode 34 are preferably connected across positive line 40 and negative line 39 to provide a predetermined and certain operating potential for the low voltage portion of the circuit across resistor 44, preferably a 3000 Ω resistor. A traditional dimming device 42 can be added to the circuit if desired by removing printed circuit link 41 as shown in FIG. 1. The zener diode 34 maintains a desired voltage across resistor 44.

One terminal of temperature sensor 36 is connected to resistor 44 and the DC supply pin of clock 13. The other terminal of the temperature sensor 36 is connected to negative line 39. A low voltage capacitor 38, preferably 25 μF, is connected across temperature sensor 36 from resistor 44 to negative line 39 in order to smooth the DC voltage across temperature sensor 36.

The clock 13 is comprised of a free-running multivibrator 14 operably connected to a dual-dual operational amplifier as a differentiator 16. The multivibrator 14 and the differentiator 16, receive a smooth DC operating voltage across temperature sensor 36. The voltage across temperature sensor 36 may swing from approximately 6 to approximately 9.5 volts depending on environmental conditions as detected by the temperature sensor 36, and the position of the dimmer 42. In aircraft applications temperature sensor 36 is typically removed and the operating voltage is fixed across resistor 44.

Figure 2D:
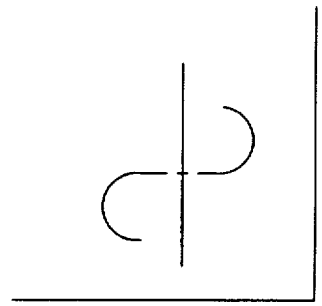
FIG. 2(d) is a graph of one of the clock's output waveforms.
Figure 2E:
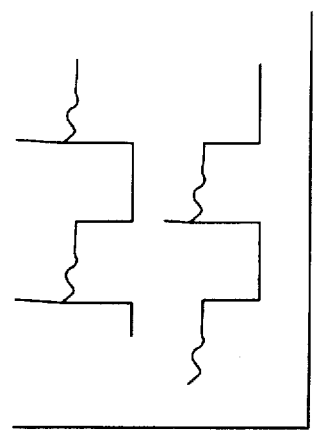
FIG. 2(e) is a illustrates both of the clock's output waveforms superimposed on the same graph.
Figure 2F:
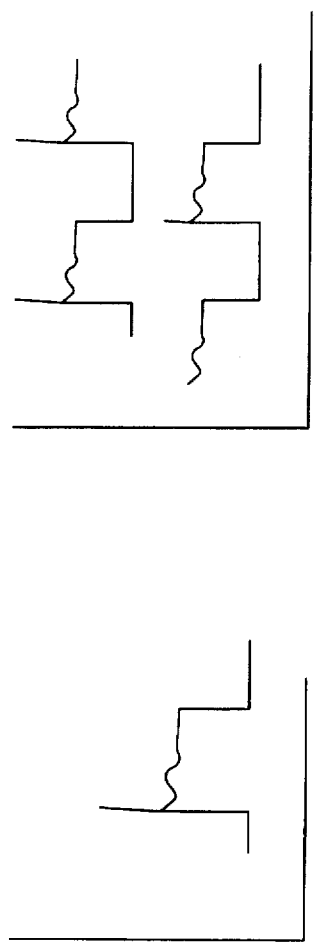
FIG. 2(f) is a graphical illustration of the reformed AC waveform as it would appear across the transformer's primary windings.

The clock 13 has two outputs 17 and 19. Each of these outputs of the clock 13 is in the form of a substantially square wave as shown in FIG. 2(d) with a magnitude that varies from approximately 6 to approximately 9.5 volts in direct proportion to the voltage across temperature sensor 36 (or across resistor 44 if the temperature sensor 36 is not utilized).

The multivibrator 14 is preferably an integrated circuit of single input operational amplifiers 47 and 49. Resistors 48, preferably 46 KΩ, and 50, preferably 28 KΩ, along with capacitor 46, preferably 25 pF, control the frequency and the stability of the substantially square wave output of the multivibrator 14. In practice, a clock frequency of 35,000 cycles per second has been found preferable.

The differentiator 16 is preferably an integrated circuit of single input operational amplifiers 51, 53, 55, and 57. It is preferably utilized as a COS/MOS HEX buffer. The dual-dual amplifiers are connected in series/parallel. The input of differentiator 16 amplifiers 51 and 53 is connected to the output of multivibrator 14 amplifier 49, and the output of differentiator 16 amplifiers 51 and 53 is connected to the input of differentiator 16 amplifiers 55 and 57.

Differentiator 16 amplifiers 51, 53, 55 and 57 work in push-pull arrangement such that amplifiers 51 and 53 turn on and drive a square wave output into resistor 54 when amplifiers 55 and 57 are off, and amplifiers 55 and 57 turn on and drive a square wave output into resistor 52 when amplifiers 51 and 53 are off.

The square wave outputs of the clock 13 preferably pass through twin wave shape filter 18 to help eliminate overshoot, spikes, and ripple. The shaped signals are then applied to the gate terminals of transistors, preferably high voltage power mosfets 72 and 74. The clock 13 rapidly turns mosfets 72 and 74 on and off as the clock's 13 output voltage exceeds the mosfet's 72 and 74 threshold voltage of preferably approximately four volts. The output of mosfets 72 and 74 is then applied to a push-pull transformer 22. The transformer 22 is connected to the load, which in this case is two fluorescent lamps 24.

The twin wave shape filter 18 is preferably constructed of two separate filters. The output of differentiator 16 amplifiers 55 and 57 is connected to a first wave shape filter, and the output of differentiator 16 amplifiers 51 and 53 is connected to a second wave shape filter. In the first wave shape filter two resistors 52 and 56 are connected in series between the output of differentiator 16 amplifiers 55 and 57 and the gate of mosfet 72. A capacitor 60 is connected between the junction of resistors 52 and 54 and negative line 39. In the second wave shape filter two resistors 54 and 58 are connected in series between the output of differentiator 16 amplifiers 51 and 53 and the gate of mosfet 74. A capacitor 62 is connected between the junction of resistors 54 and 58 and negative line 39.

Charging and discharging of capacitor 60 filters and shapes the positive and substantially square waveform output of differentiator 16 amplifiers 55 and 57 so that it has a waveform substantially that of a cosine wave at the gate of mosfet 72. Charging and discharging of capacitor 62 filters and shapes the positive and substantially square waveform output of differentiator 16 amplifiers 51 and 53 so that it has a waveform substantially that of a sine wave at the gate of mosfet 74. The resistors 52, 54, 56 and 58 in the twin wave shape filter 18 regulate the voltage amplitude of the waveform.

In the low voltage switching portion of the circuit two mosfets 72 and 74 are rapidly turned on and off by the low voltage sine and cosine waves at their respective gates. Power diodes 68 and 70 are placed in reverse at the drain terminals of mosfets 74 and 72 respectively, with the anodes of power diodes 68 and 70 connected to transformer windings 80 and 82 respectively, to block reverse current flow. Capacitors 64 and 66 are connected between the drain terminals of mosfets 72 and 74 respectively, and the negative line 39 to protect against transformer spikes. Resistors 76 and 78 are connected between the gate terminals of mosfets 72 and 74 respectively, and the negative line 39 for protection against static.

The push-pull transformer 22 is comprised of two separate 90 turn primary control windings 80 and 82, a single 150 turn high voltage secondary winding 86, and three low voltage filament heater secondary windings 84, 88, and 90. The primary windings 80 and 82, are preferably wound bifilar such that both windings are wound from start to end next to each other on the inner core. A single 150 turn high voltage secondary winding 86 is preferably wound directly on top of the primary control windings 80 and 82. The three low voltage secondary windings 84, 88 and 90 are then preferably wound on the outside. The primary control windings 80 and 82 are deliberately wound on the inside of the core for reduced voltage effectiveness, voltage effectiveness is further reduced by a two millimeter gap in the pot core. Litz wire is preferably utilized for the transformer 22 windings. Litz wire allows the use of a subminiature design transformer 22 that is capable of carrying the current required for operation of the preferred circuit.

The start of winding 80 and the end of winding 82 are connected to the positive line 40. The end of winding 80 is connected to power diode 68 at the anode, and the start of winding 82 is connected to power diode 70 at the anode. This configuration designates the sine and cosine waves at the transformer primary windings 80 and 82. See FIG. 2(f).

The transformer 22 secondary is completely electrically isolated from the primary. The secondary load is a pair of hot cathode fluorescent lamps 24, connected in a parallel relation. One filament heater of each lamp is connected in parallel to the other, to form a common. The three turn 4.5 volt secondary winding 84 is connected across the common, and the three turn 4.5 volt secondary windings 88 and 90 are connected to the two independent filament heaters. In the preferred embodiment secondary heater winding 84 is electrically insulated from the other secondary heater windings 88 and 90 to 5000 volts.

The start of the 150 turn high voltage secondary winding 86 is connected to the end of low voltage secondary winding 84 so that it is in phase with low voltage secondary winding 84. The end of high voltage secondary winding 86 is connected through fuses 96 and 98 to a first and a second capacitive circuit element 92 and 94. Capacitive elements 92 and 94 are each comprised of two capacitors connected in series. The capacitors (four total) comprising capacitive elements 92 and 94 are preferably 0.015 mF, 5% tolerance, and nonpolarized. Capacitive elements 92 and 94 smooth the electron flow through the tubes, and help dampen the surge at the secondary zero cross over.

The output from capacitive element 92 is connected to the start of low voltage secondary winding 88, and the output of capacitive element 94 is connected to the start of low voltage secondary winding 90. As the secondary is energized and the four filament heaters are heated, the filament wires, preferably thoriated tungsten, form four negative electron cushions. Electrons are then attracted along the tube to form a bridge. The rising high voltage electrons pass along the bridge to charge capacitive elements 92 and 94 to a high level. Experimentation has shown that this charge rate is dependent on tube make and manufacturer, the random electrons retained in capacitive elements 92 and 94, and the voltage across temperature sensor 36. The higher the tube demand or discharge, the higher the electron residue to oppose the inrush current at the secondary crossover. The charge rate of capacitive elements 92 and 94 restricts the secondary current to that demanded by the tubes 24 to maintain maximum light output, approximately 110 ma per tube. The economy is reflected in the reduced primary current.

This device may easily be converted into a four tube unit. This is accomplished by connecting the outputs of the twin wave shape filter 18, taken at points x and y, to the input resistors of a second pair of identical push-pull power amplifiers and push-pull transformers (not shown). This is in turn connected to a second pair of fluorescent lamps (not shown).

Radio frequency interference has been suppressed in the design in three modes, line, direct and magnetic. Line suppression may be accomplished by means of VHF filter 10 placed in the line as shown in FIG. 1. This line suppression prevents the clock pulses from feeding back onto the line and neutral, this preserves the integrity of the incoming sinusoidal waveform that is applied across input terminals 26 and 28. The filter used is preferably a ferox rod 0.7 inches long and 0.25 inches in diameter. The material used is preferably 3C8. The winding is preferably 132 turns of 27 AWG wire.

Direct suppression is facilitated by the twin wave shape filter 18. The clock's 13 outputs 17 and 19 are square waveforms with a fast rise time and an overshoot spike followed by a harmonic ripple. This waveform is reshaped by the twin wave shape filter 18 for suppression. A high level of suppression is required for aircraft ADF and ILS equipment as well as for military communications. However, for commercial applications resistors 56 and 58 and capacitors 60 and 62 may be omitted from the circuit.

Magnetic suppression is accomplished by constructing the transformer 22 from a 4229 pot core of 3C8 material. This localizes the generated magnetic flux and magnetically screens the windings from external magnetic radiation.

While embodiments and applications of this device have been shown and described, it would be apparent to those skilled in the art that many more modifications are possible without departing from the inventive concepts disclosed herein. The invention, therefore is not to be restricted except in the spirit of the following claims.

I claim:

1. An electronic power converter for converting an AC operating potential to an AC power supply comprising:

an AC power input for receiving the AC operating potential;

a rectifier having an input electrically connected to the AC power input for generating a pulsating DC signal from the AC operating potential;

first and second transistors;

means for supplying alternating pulses at a predetermined frequency to the first and second transistors, the alternating pulses having a sufficient voltage level to turn the transistors on and off; and a transformer driven by the first and second transistors, the transformer comprising first and second primary windings each of which are electrically connected to receive the pulsating DC signal and a secondary winding for coupling to a load, the first and second transistors being turned on and off in push-pull arrangement in response to the alternating pulses to generate an amplitude modulated signal across the first and second primary windings, wherein the amplitude modulated signal is carried on the pulsating DC signal and has a voltage swing that is substantially proportional to the voltage level of the alternating pulses supplied to the transistors and in a range from approximately 6 to approximately 9.5 volts during operation of the converter.

2. The electronic power converter of claim 1 further comprising a reservoir capacitor having a capacitance of approximately 0.3 micro farads.

3. The electronic power converter of claim 1 further comprising a reservoir capacitor having a capacitance of less than approximately 100 micro farads.

4. The electronic power converter of claim 1 further comprising a reservoir capacitor having a capacitance of less than approximately 25 micro farads.

5. The electronic power converter of claim 1 wherein the first and second transistors are power MOSFETS and further comprising first and second diodes, the first diode connected between the first MOSFET and the first primary winding and the second diode connected between the second MOSFET and the second primary winding.

6. The electronic power converter of claim 1 wherein the predetermined frequency of the alternating pulses supplied to the the first and second transistors is approximately 35,000 cycles per second.

7. The electronic power converter of claim 1 further comprising means for varying the voltage level of the alternating pulses.

8. The electronic power converter of claim 1 further comprising means for filtering the alternating pulses supplied to the first and second transistors.

9. The electronic power converter of claim 2 wherein the rectifier is a full wave rectifier and the reservoir capacitor holds the rectified pulsating DC signal to approximately 8 volts above the zero crossover of the AC operating potential received at the AC power input.

10. The electronic power converter of claim 1 wherein the transformer is a push-pull current transformer.

11. The electronic power converter of claim 1 further comprising means for varying the voltage level of the alternating pulses in response to ambient temperature.

12. The electronic power converter of claim 1 further comprising a high voltage secondary winding and a low voltage secondary winding and a capacitive element connected therebetween, the capacitive element comprising two nonpolarized capacitors connected in series.

13. An electronic circuit for powering gas discharge lamps comprising:

an AC input;

means for generating a pulsating DC signal;

first and second transistors;

a clock including an input and first and second outputs, the clock input electrically connected to a variable voltage DC source, the first and second clock outputs are electrically connected to the first and second transistors and comprise substantially square-wave signals approximately one-half cycle out of phase with each other and varying in voltage in approximate proportion to the variable voltage DC source;

a transformer comprising first and second primary windings and a secondary winding for connecting across a load, the first primary winding being electrically connected between the pulsating DC signal and the first transistor, the second primary winding being electrically connected between the pulsating DC signal and the second transistor; the first and second transistors being turned on and off in push-pull arrangement by the respective first and second clock outputs to create an amplitude modulated signal across the first and second primary windings, said amplitude modulated signal is carried on the pulsating DC signal and is substantially proportional to the variable voltage DC source; and a reservoir capacitor connected across the pulsating DC signal comprising a capacitance of less than approximately 100 micro farads.

14. The electronic circuit of claim 13 wherein the reservoir capacitor has a capacitance of approximately 0.3 micro farads and wherein the transistors are power MOSFETS.

15. The electronic circuit of claim 13 wherein the variable voltage DC power source provided to the clock input is responsive to a temperature sensor.

16. The electronic circuit of claim 13 further comprising a dimmer connected between the variable voltage DC power source and the clock input for varying the variable voltage DC power source provided to the clock.

17. The electronic circuit of claim 13 wherein the transformer is a push-pull current transformer, and the primary windings operate in response to the amplitude modulated signal, the amplitude modulated signal has an AC signal swing of approximately 6 to approximately 9.5 volts.

18. The electronic circuit of claim 13 further comprising first and second wave shape filters connected between the respective first and second clock outputs and the respective first and second transistors.

19. The electronic circuit of claim 13 further comprising a high voltage secondary winding, a low voltage secondary winding and a capacitive element connected therebetween, the capacitive element comprising two nonpolarized capacitors connected back to back in series.

20. The electronic circuit of claim 13 wherein the substantially square-wave signals are fixed in frequency at around 35,000 cycles per second.

21. A lighting fixture apparatus for powering gas discharge lamps comprising:

an AC power input for receiving an AC input signal from a main line AC power supply;

a rectifier connected to said AC power input for generating a pulsating DC signal from said AC input signal;

first and second transistors, each having an input and an output;

a clock for supplying alternating pulses at a predetermined frequency to said inputs of said first and second transistors to turn said first and second transistors on and off in alternating sequence, said first and second transistors for generating alternating outputs in response to said alternating pulses from said clock;

a transformer having first and second primary windings and a secondary winding, said first and second primary windings each connected to said rectifier and to respective first and second transistor outputs, said primary windings being driven push-pull by said transistor outputs to generate an amplitude modulated signal of relatively small scale with respect to said pulsating DC signal on said pulsating DC signal, said first and second primary windings operating in response to said amplitude modulated signal; and a gas discharge lamp connected across said secondary winding.

22. The apparatus of claim 21 further comprising a reservoir capacitor connected across said AC power input having a capacitance of less than approximately 25 micro farads and wherein said first and second transistors are power MOSFETs.

23. The apparatus of claim 21 wherein said gas discharge lamp is a fluorescent lighting tube.

24. The apparatus of claim 23 further comprising a second fluorescent lighting tube connected across said secondary winding.

25. The apparatus of claim 21 wherein said lighting fixture operates without creating an appreciable amount of inrush current on the main line power supply.

26. The apparatus of claim 21 wherein said transformer is a push-pull current transformer and said reservoir capacitor is approximately 0.3 micro farads.

27. The apparatus of claims 21 wherein said amplitude modulated signal has an AC signal swing in a range from approximately 6 to approximately 9.5 volts.

28. The apparatus of claim 27 wherein said predetermined frequency is approximately 35,000 cycles per second.

29. The apparatus of claim 21 wherein said reservoir capacitor is less than approximately 10 micro farads.

30. A method of converting a main line AC power signal to an AC power signal suitable for powering gas discharge lamps without creating an appreciable amount of inrush current, the method comprising:

(a) rectifying the main line AC power signal to create a pulsating DC signal;

(b) generating a DC clocking signal from said pulsating DC signal;

(c) supplying said DC clocking signal to first and second switches;

(d) generating an alternating output from said switches;

(e) supplying said pulsating DC signal to a pair of primary windings on a transformer;

(f) applying said alternating output from said switches to said pair of primary windings;

(g) generating an amplitude modulated signal across said primary windings by switching said switches on and off, said amplitude modulated signal is carried on said pulsating DC signal and of relatively small scale with respect to said pulsating DC signal, said primary windings operating in response to said amplitude modulated signal; and (h) transforming said relatively small scale amplitude modulated signal into an AC signal of suitable voltage and current levels for powering one or more gas discharge lamps;

wherein use of said amplitude modulated signal functions to prevent an appreciable amount of inrush current on the main line AC power signal.

31. The method of claim 30 wherein said amplitude modulated signal has a voltage swing in a range between approximately 6 and approximately 9.5 volts depending on operating mode and environmental conditions.

32. The method of claim 31 wherein said DC clocking signal is proportional to said voltage swing and has a constant frequency capable of preventing radio frequency interference.

33. The method of claim 32 wherein said constant frequency is approximately 35,000 cycles per second.

* * * * *

UNITED STATES PATENT AND TRADEMARK OFFICE
CERTIFICATE OF CORRECTION

PATENT NO.  : 5,604,409
DATED       : February 18, 1997
INVENTOR(S) : Fisher

It is certified that error appears in the above-indentified patent and that said Letters Patent is hereby corrected as shown below:

In column 3, line 59, delete "500Ω" and insert therefor -- 5000Ω --.

Signed and Sealed this

Nineteenth Day of August, 1997

*Attest:*

BRUCE LEHMAN

*Attesting Officer*  *Commissioner of Patents and Trademarks*